Patented Sept. 2, 1924.

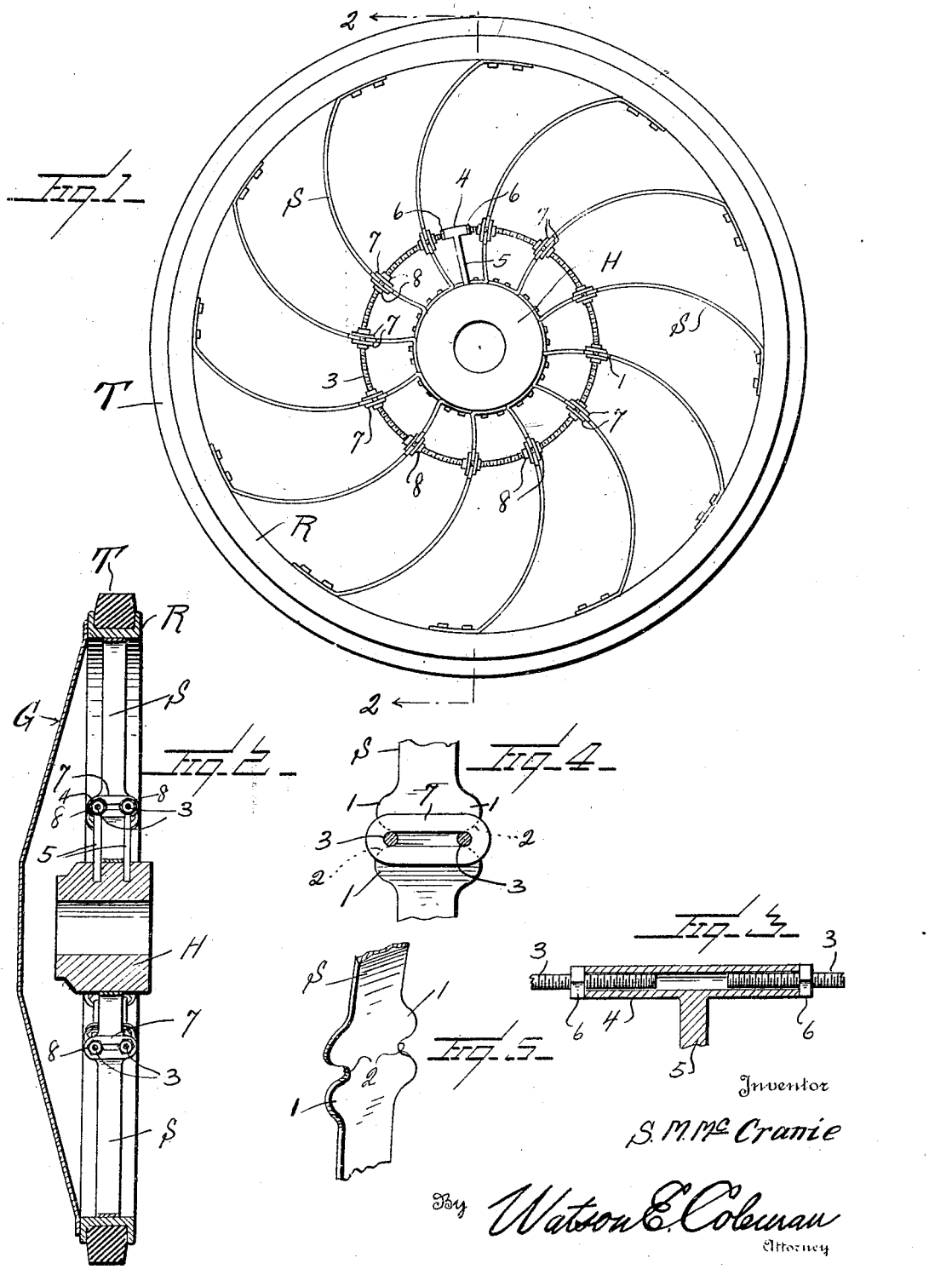

1,507,400

UNITED STATES PATENT OFFICE.

SHAFTER M. McCRANIE, OF HARTFORD, ALABAMA, ASSIGNOR OF ONE-HALF TO JOHN W. HAUSE, OF TAMPA, FLORIDA.

CUSHION WHEEL.

Application filed July 1, 1922, Serial No. 572,212. Renewed March 6, 1924.

*To all whom it may concern:*

Be it known that SHAFTER M. McCRANIE, a citizen of the United States, residing at Hartford, in the county of Geneva and State of Alabama, has invented certain new and useful Improvements in Cushion Wheels, of which the following is a specification, reference being had to the accompanying drawings.

This invention relates to certain improvements in cushion wheels and it is an object of the invention to provide a novel and improved device of this general character wherein the hub and rim are connected by yielding spokes and wherein means are associated with said spokes for centering the same and for regulating the tension thereof.

Another object of the invention is to provide a novel and improved wheel of this general character wherein the use of air is avoided and whereby a wheel structure is provided which operates effectively to absorb shocks and jars incident to travel.

The invention consists in the details of construction and in the combination and arrangement of the several parts of my improved cushion wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein, Figure 1 is a side elevational view of a wheel constructed in accordance with an embodiment of my invention;

Figure 2 is a sectional view taken substantially on the line 2—2 of Figure 1;

Figure 3 is an enlarged fragmentary view partly in section and partly in elevation illustrating in detail the supporting means for and regulating the rod;

Figure 4 is a fragmentary view partly in section and partly in elevation illustrating the means for holding the regulating rods to the spoke; and Figure 5 is a fragmentary view in perspective of a portion of a spoke and illustrating the recesses or notches therein to receive the regulating rods.

As disclosed in the accompanying drawings, H denotes a hub of conventional construction and which is associated with a rim R, said rim and hub being connected at equidistantly spaced points with arcuate spring spokes S, said spokes being curved in the same general direction. Each of the spokes S at a point in relatively close proximity to the hub H is provided with oppositely directed wings 1 provided at their outer ends with notches or recesses 2.

Associated with each side of the wheel structure is a threaded rod 3 which when in applied position is received within the notches or recesses 2 of the spokes S at one side of the wheel structure, the extremities of said rod 3 being disposed within the opposite end portions of a sleeve 4. The sleeve 4 is carried by the outer end portion of an outstanding post or arm 5 carried by the periphery of the hub H and radiating therefrom. Threaded upon the extremities of the rod 3 and co-acting with the ends of the associated sleeve 4 are the nuts 6 whereby means is provided to compensate for the desired expansion and contraction of the rod 3 as the requirements of practice may prefer. The applied rods 3 are held against displacement with respect to the spokes S by the slotted plates 7 arranged at opposite sides of each of the spokes S and in contact therewith. Threaded upon each of the rods 3 and contacting with each of the plates 7 are the nuts 8.

After the rods 3 have been applied the nuts 8 associated with each of the springs S are adjusted to properly center the spoke and when the wheel is free of load and the rods 4 are substantially concentric to the hub H it will at once be obvious that the spokes S have been properly adjusted. It will also be understood that the adjustment of the nuts 8 will be employed to increase or decrease to a certain degree the tension of the spokes S and which is of particular advantage to compensate for loads of different weights. As the nuts 8 are adjusted in one direction along the rods 3 the spokes S will be flexed to increase the tension thereof and when said nuts are adjusted in the opposite direction the tension of the spokes will be decreased.

Mounted upon the rim R is a tire T preferably of a solid type and overlying the outer face or side of the wheel and secured to the rim is the guard or shield G.

From the foregoing description it is thought to be obvious that a cushion wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A wheel structure comprising a hub, a rim, spring spokes connecting said hub and rim, a substantially annular rod arranged at one side of the wheel and freely engaged with the spokes, means for attaching said rod to the hub, and means carried by said rod and co-acting with the spokes for regulating the tension of the spokes.

2. A wheel structure comprising a hub, a rim, spring spokes connecting said hub and rim, side marginal portions of the spokes being provided with recesses, a substantially annular rod seated within said recesses of the spokes, means for holding said rod against displacement, and means carried by the rod and co-acting with the spokes for flexing the spokes.

3. A wheel structure comprising a hub, a rim, spring spokes connecting said hub and rim, side marginal portions of the spokes being provided with recesses, a substantially annular rod seated within said recesses of the spokes, means for holding said rod against displacement, and means carried by the rod and co-acting with the opposite sides of the spokes for flexing the spokes.

4. A wheel structure comprising a hub, a rim, spring spokes connecting said hub and rim, said spokes in their opposite sides being provided with recesses, substantially annular rods seating within said recesses and arranged at opposite sides of the wheel, means co-acting with said rods for holding the same against displacement, and means carried by the rods and co-acting with the spokes for flexing the spokes.

5. A wheel structure comprising a hub, a rim, spring spokes connecting said hub and rim, said spokes in their opposite sides being provided with recesses, substantially annular rods seating within said recesses and arranged at opposite sides of the wheel, means co-acting with said rods for holding the same against displacement, means carried by the rods and co-acting with the spokes for flexing the spokes, and means for connecting each of the rods to the hub.

6. A wheel structure comprising a hub, a rim, spring spokes connecting said hub and rim, side marginal portions of the spokes being provided with recesses, a substantially annular rod seated within said recesses of the spokes, means for holding said rod against displacement, means carried by the rod and co-acting with the spokes for flexing the spokes, and a sleeve carried by the hub outwardly of the periphery thereof, the rod having its end portions extending within the sleeve through the opposite ends thereof.

7. A wheel structure comprising a hub, a rim, spring spokes connecting said hub and rim, side marginal portions of the spokes being provided with recesses, a substantially annular rod seated within said recesses of the spokes, means for holding said rod against displacement, means carried by the rod and co-acting with the spokes for flexing the spokes, a sleeve carried by the hub outwardly of the periphery thereof, the rod having its end portions extending within the sleeve through the opposite ends thereof, and members threaded upon the end portions of the rod for contact with the ends of the sleeve.

In testimony whereof I hereunto affix my signature.

SHAFTER M. McCRANIE.